US012690530B2

(12) United States Patent
Chen

(10) Patent No.: US 12,690,530 B2
(45) Date of Patent: Jul. 28, 2026

(54) WATERWAY STRUCTURE FOR A FLOWERPOT STAND

(71) Applicant: Shui-Tung Chen, Changhua County (TW)

(72) Inventor: Shui-Tung Chen, Changhua County (TW)

( * ) Notice: Subject to any disclaimer, the term of this patent is extended or adjusted under 35 U.S.C. 154(b) by 102 days.

(21) Appl. No.: 18/795,492

(22) Filed: Aug. 6, 2024

(65) Prior Publication Data

US 2026/0041051 A1 Feb. 12, 2026

(51) Int. Cl.
*A01G 27/00* (2006.01)

(52) U.S. Cl.
CPC ......... *A01G 27/001* (2013.01); *A01G 27/003* (2013.01)

(58) Field of Classification Search
CPC ......... A01G 27/02; A01G 27/04; A01G 27/06
See application file for complete search history.

(56) References Cited

U.S. PATENT DOCUMENTS

| | | | |
|---|---|---|---|
| 2021/0185947 A1 * | 6/2021 | Crawford | A01G 27/00 |
| 2024/0188518 A1 * | 6/2024 | Moskal | A01G 31/06 |
| 2024/0407305 A1 * | 12/2024 | Dooris | A01G 9/02 |

* cited by examiner

*Primary Examiner* — Joshua J Michener
*Assistant Examiner* — Henry Hooper Mudd
(74) *Attorney, Agent, or Firm* — MUNCY, GEISSLER, OLDS & LOWE, P.C.

(57) ABSTRACT

A waterway structure for a flowerpot stand is disclosed. The flowerpot stand is assembled with a waterway device, including plural poles, plural bearing elements and a waterway device. Each pole is provided with an external assembly board, plural through-holes and a lower through-hole. The bearing element provides for placing a flowerpot, the waterway device is provided with plural lower water hoses and plural upper water hoses, the lower water hose is connected at a bottom of the pole, and the upper water hose is connected at a position above the pole. The pole is used as a support structure and also for a water source to flow through. Through the lower water hose, the water source enters into the connected poles and flow to the upper hoses, and is then poured into the flowerpots from the upper water hoses.

10 Claims, 6 Drawing Sheets

WATERWAY STRUCTURE FOR A FLOWERPOT STAND

BACKGROUND OF THE INVENTION

(a) Field of the Invention

The present invention relates to a waterway structure for a flowerpot stand, and more particularly to a waterway structure for a flowerpot stand, wherein poles of the flowerpot stand are a support structure and also a waterway structure that the appearance of entire assembly is beautiful and elegant. In addition, there is no irregular waterway and the entire assembly is neat and uniform, without the need for setting up a piping that is explicitly exposed and with a water source being able to flow completely through the designated poles.

(b) Description of the Prior Art

As it is not easy to acquire a land, the green plant in a home life is still mostly based upon the bonsai. Putting the bonsai indoors or outdoors can achieve the effects of purifying air, beautifying environment, refreshing, adjusting emotion, adding fun, improving physical and mental health, as well as increasing human immunity. The plants of bonsai can facilitate eliminating particulate matter, formaldehyde, carbon monoxide, carbon dioxide, and bacterioplankton, as well as can release negative ions, oxygen and water. Furthermore, the plants contain water and is able to absorb electromagnetic waves. Therefore, the bonsai can relax and de-stress, allowing the *Homo sapiens* who constantly stare screens to watch the green plants for a change occasionally, which helps protecting eyes. On the other hand, loving the plants can even have the effect of stabilizing emotion, and planting the flowers can promote mental health, and reduce psychological stress, anxiety and depression. Through growing the plants, watering the bonsai every day, seeing the change in seasons during the growth of plants and the various scenes of blooming and fading of flowers, one can have a sense of joy and obtain a healing effect.

Although planting the bonsai has so much effects, placing the bonsai is extremely important. If the bonsai is put irregularly, one will get the opposite effects without having the original effects. Therefore, the bonsai should be put and set up orderly that one can enjoy and relax. Putting the bonsai orderly relies on a flowerpot stand, and the flowerpot stands sold on the market all provide for placing the bonsai orderly. The bonsai can be set up on the flowerpot stand in more than two or three layers, where the flowerpot stand is primarily constituted by plural vertical struts, plural horizontal struts and plural bearing elements. The vertical struts and the horizontal struts are crisscrossed to form the flowerpot stand, wherein the bearing element can be a bearing board or plural bearing rods, and is disposed between two horizontal struts in the same layer to provide for placing the bonsai. This is the common flowerpot stand and a bonsai grower will need to water the bonsai regularly. As watering the bonsai will start from the upper layer bonsai to the lower layer bonsai sequentially, the floor can get wet easily to contaminate indoor environment. Moreover, when the grower leaves the house for several days or forgets to water the bonsai, the plants will be blighted often. Accordingly, there are automatic bonsai watering devices on the market.

For an automatic bonsai watering device, a conventional flowerpot stand is provided with plural piping along the vertical struts or horizontal struts, and a tail end of the piping is provided with a nozzle which is disposed above the bonsai. In addition to being connected with a water source, the source of piping is also provided with a water source control valve, a time switch or a flow controller additionally, so that the bonsai can be watered at regular time and quantity, thereby preventing the plants from being blighted. However, the water piping of this kind of automatic bonsai watering device is exposed out of the vertical struts or horizontal struts of the flowerpot stand, which is very ugly. Besides, after a long time of use, the piping can easily fall off from the vertical struts or horizontal struts, and the nozzle cannot be aligned to the bonsai. In addition, as the piping is set up by a consumer after procuring the device, and the piping needs to be set up layer by layer, it is not an easy task for the consumer.

SUMMARY OF THE INVENTION

Accordingly, the present invention provides a waterway structure for a flowerpot stand, comprising plural poles, each of which is a hollow vertical rod, with a space being disposed between two poles to form a front row of poles opposite to a rear row of poles to be arranged into at least two rows;

plural bearing elements, each of which is disposed between two neighboring poles for placing a flowerpot, and with the present invention being characterized in that an exterior side of the pole is provided with an assembly board, the assembly board of a front row pole is opposite to the assembly board of a rear row pole, each pole is provided with plural through-holes and a lower through-hole at bottom, the bearing element is constituted by two horizontal rods and plural longitudinal rods, the horizontal rods are perpendicular to the longitudinal rods, the horizontal rods are disposed between two neighboring poles in the front row as well as between the two neighboring poles in the rear row, and the longitudinal rods are distributed between the two horizontal rods; and a waterway device, which is constituted by plural lower water hoses and plural upper water hoses, with that the lower water hoses are assembled at the lower through-holes at the bottoms of the poles in the front row, the lower water hoses are connected between the bottoms of the poles, a through-hole above the pole can be connected to an upper water hose, a tail end of the upper water hose is a nozzle, the nozzle is disposed above the flowerpot, the water source enters into the connected pole through the lower water hose and flows to the upper water hose, and is then sprayed into the flowerpot through the nozzle.

A primary object of the present invention is to provide a waterway structure for a flowerpot stand, wherein the poles of flowerpot stand are a support structure and also a waterway structure. The present invention is beautiful and has an elegant appearance, the waterway is neat and uniform without irregularity, there is no need to set up the piping that is explicitly exposed, and the water source can completely flow into each pole.

Another object of the present invention is to provide a waterway structure for a flowerpot stand, wherein the pole is provided with the assembly board that is extended outward, and all the bearing elements are set up by the assembly boards, which are solid and reliable, improving the shortcoming in a prior art where a conventional pole needs to be drilled with holes to set up the bearing element by studs.

Still another object of the present invention is to provide a waterway structure for a flowerpot stand, wherein all lower water hoses and upper water hoses are locked reliably by hollow nuts that even when the consumer moves the flowerpot stand by oneself, the lower water hoses and the upper water hoses will not be loosening.

Yet another object of the present invention is to provide a waterway structure for a flowerpot stand, wherein the waterway in one set of flowerpot stand can flow to another set of flowerpot stand, or a flowerpot stand which is set up extendedly can be also extended with a waterway to flow through; therefore, the consumer can set up the flowerpot stand extendedly and extend the waterway by oneself, according to the need and environment, with that the assembly is easy and convenient.

Still yet another object is to provide a waterway structure for a flowerpot stand, wherein the waterway device is provided with a flow control valve to control the flow rate, and a time switch to turn on or off the water source at regular time, so that when a user leaves the house for several days, he or she can plan time and flow rate in advance, allowing the bonsai to keep moisturized without being blighted and faded.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
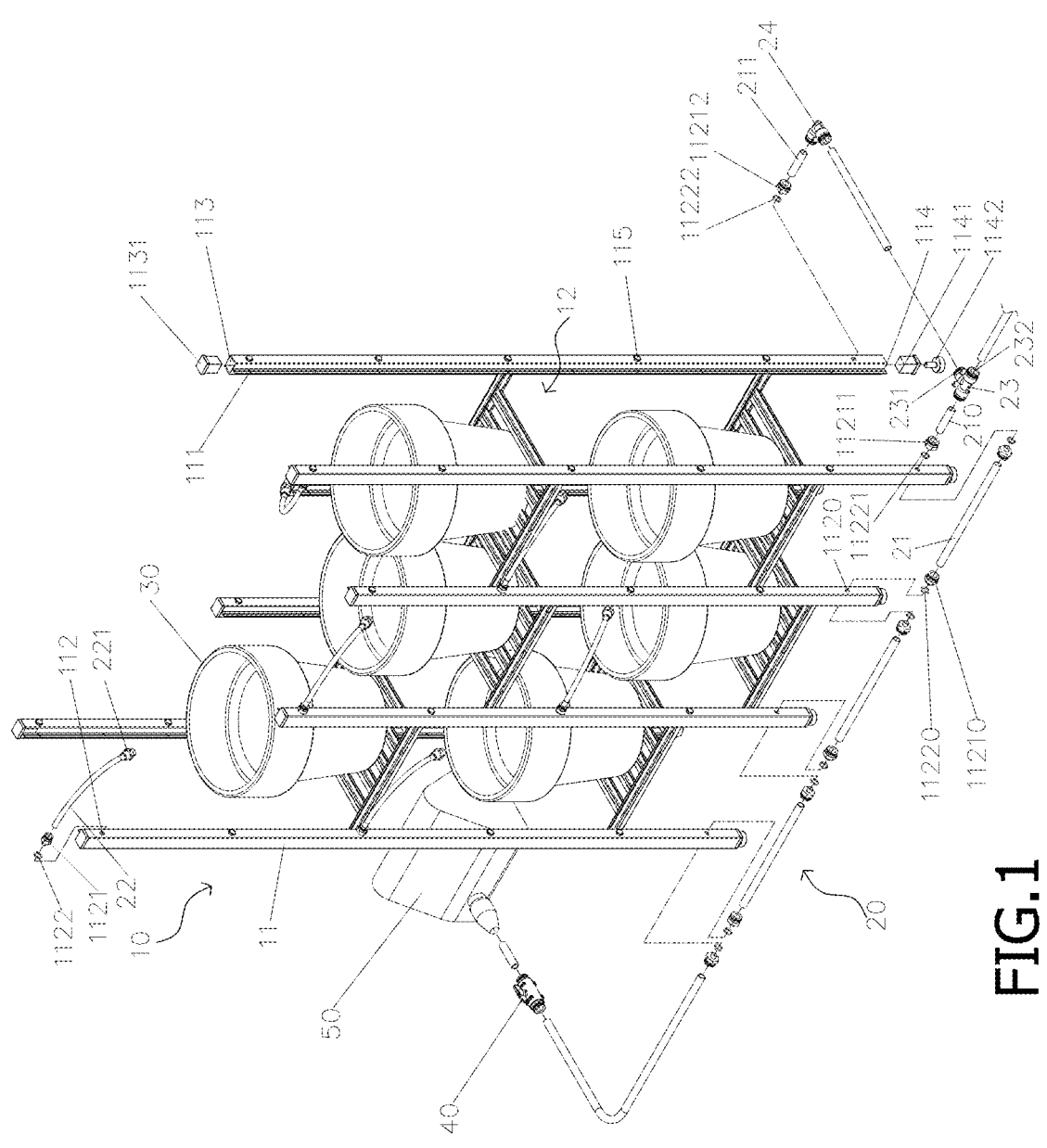
FIG. 1 shows an exploded three-dimensional view of a flowerpot stand assembly and part of a waterway device, according to the present invention.
Figure 5:
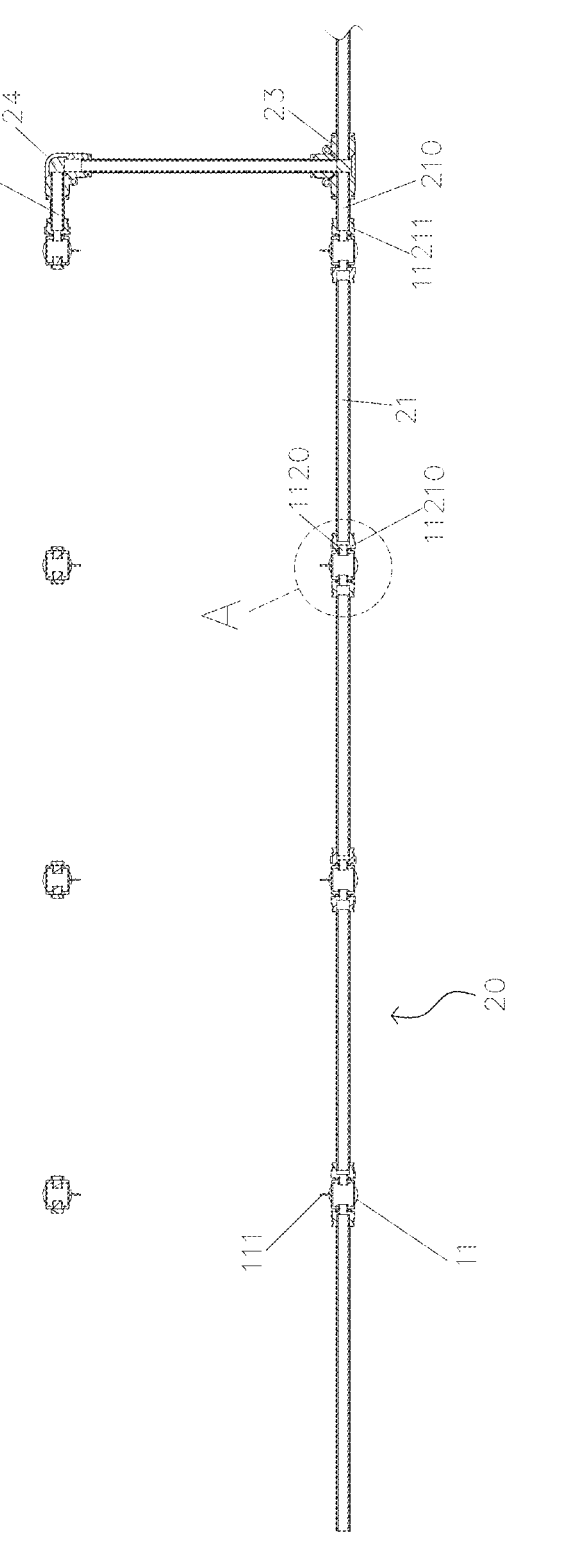
FIG. 5 shows a cutaway view of a waterway path which is extended from a waterway device of poles in a front row to bottoms of poles in a rear row, according to the present invention.
Figure 5A:
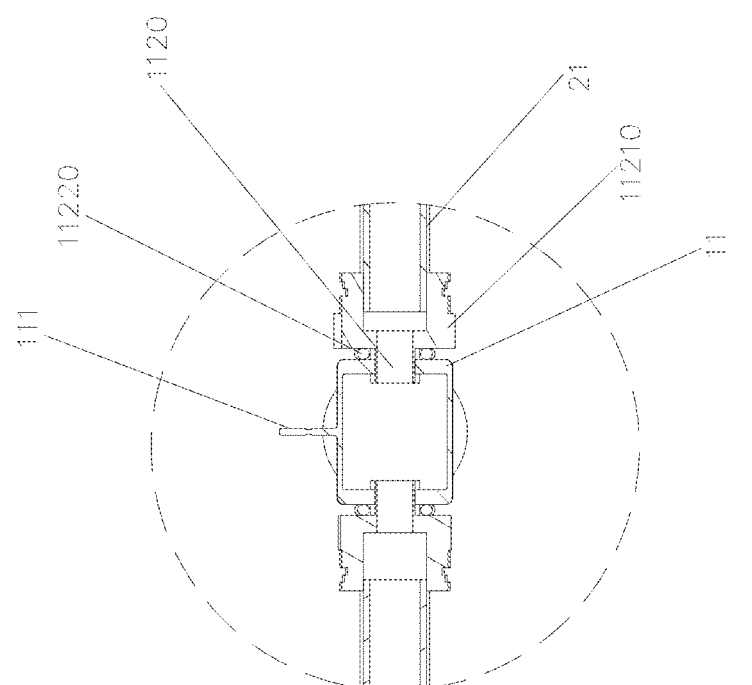
FIG. 5A shows an enlarged cutaway view at a mark A in FIG. 5.

Referring to FIGS. 1 to 5, a flowerpot stand 10 is assembled with a waterway device 20. The flowerpot stand 10 comprises plural poles 11 and plural bearing elements 12, each pole 11 is a hollow vertical rod, and a space is disposed between the two poles 11, forming the poles 11 in a front row opposite to the poles 11 in a rear row (the poles 11 in the front row have the same shapes and structures as those of the poles 11 in the rear row), which are arranged into at least two rows. The bearing elements 12 are set up between two neighboring poles 11, and each bearing element 12 provides for placing a flowerpot 30. An exterior side of the pole 11 is provided with an assembly board 111 (as shown in FIG. 5A), the assembly board 111 of the pole 11 in the front row is opposite to the assembly board 111 of the pole 11 in the rear row, and each pole 11 is provided with plural through-holes 112 and a lower through-hole 1120. The through-holes 112 are threaded holes, and the lower through-hole 1120 is also a threaded hole. The bearing element 12 is constituted by two horizontal rods 121 and plural longitudinal rods 122, and the horizontal rods 121 are perpendicular to the longitudinal rods 122. The horizontal rods 121 are set up between two neighboring poles 11 in the front row, as well as between two neighboring pole 11 in the rear row; whereas the longitudinal rods 122 are distributed between the two horizontal rods 121. The assembly board 111 of the pole 11 is assembled at the horizontal rod 121 of the bearing element 12 by transfixing with plural studs 123 (self-tapping studs), and the horizontal rods 121 of the bearing element 12 are assembled at the longitudinal rods 122 by transfixing with plural studs 124 (self-tapping studs). A top end of the pole 11 is provided with a top opening 113 (as shown in FIG. 1), and the top opening 113 is blocked by a top plug 1131. In addition, a bottom end of the pole 11 is provided with a bottom opening 114, the bottom opening 114 is blocked by a bottom plug 1141, and a bottom surface of the bottom plug 1141 is assembled with a foot pad 1142.

The waterway device 20 is provided with plural lower water hoses 21 and plural upper water hoses 22. Each lower water hose 21 is assembled at a bottom of the pole 11 in the front row or a bottom of the pole 11 in the rear row. The lower through-hole 1120 at the bottom of the pole 11 can be connected to the lower water hose 21, and the lower water hose 21 can be connected between the bottoms of the poles 11. The lower water hose 21 enters into the lower through-hole 1120 and is assembled at an outer part by a hollow nut 11210 and a seal ring 11220. A through-hole 112 above the pole 11 can be connected to an upper water hose 22, the upper water hose 22 enters into the through-hole 112 and is also assembled at an outer part by a hollow nut 1121 and a seal ring 1122. A tail end of the upper water hose 22 is a nozzle 221, and the nozzle 221 is disposed above the flowerpot 30. The through-hole 112 that is not connected to the upper water hose 22 or the lower through-hole 1120 that is not connected to the lower water hose 21 is blocked by a solid nut 115.

A flow control valve 40 and a time switch 50 are connected to the lower water hose 21 at the most front end of the waterway device 20, and are connected to a water source. Through the time switch 50 and the flow control valve 40, the water source is fed into each lower water hose 21 at regular time and quantity, allowing the water source to enter into the connected poles 11 through the lower water hoses 21. In addition, the water source enters into the poles 11 and flows to the upper water hoses 22, and is then sprayed into the flowerpots 30 from the nozzles 221.

By the abovementioned structures, upon assembling, plural bearing elements 12 are first set up between two neighboring poles 11. Next, according to the layers at various levels, plural studs 123 are transfixed into the assembly boards 111 of the poles 11 to be combined at the horizontal rods 121 of the bearing elements 12, and the horizontal rods 121 are combined with the longitudinal rods 122 by transfixing with plural studs 124, thereby assembling the bearing elements 12 between two neighboring poles 11, with each bearing element 12 being able to be placed with a flowerpot 30. The lower water hoses 21 of the waterway device 20 are assembled one-by-one into the lower through-holes 1120 at the bottoms of the poles 11. Each lower water hose 21 is connected between the poles 11, the upper water hose 22 is assembled into a through-hole 112 above the pole 11, the nozzle 221 of the upper water hose 22 is made to face toward an upper side of the flowerpot 30, the flow control valve 40 and the time switch 50 are connected to the lower water hose 21 at the most front end of the waterway device 20, and then the water source is connected. By the time switch 50 and the flow control valve 40, the water source is fed into each lower water hose 21 at regular time and quantity, allowing the water source to enter into the connected poles 11 through the lower water hoses 21. In addition, the water source enters into the poles 11 and flows to the upper water hoses 22, and is then sprayed into the flowerpots 30 from the nozzles 221.

Figure 2:
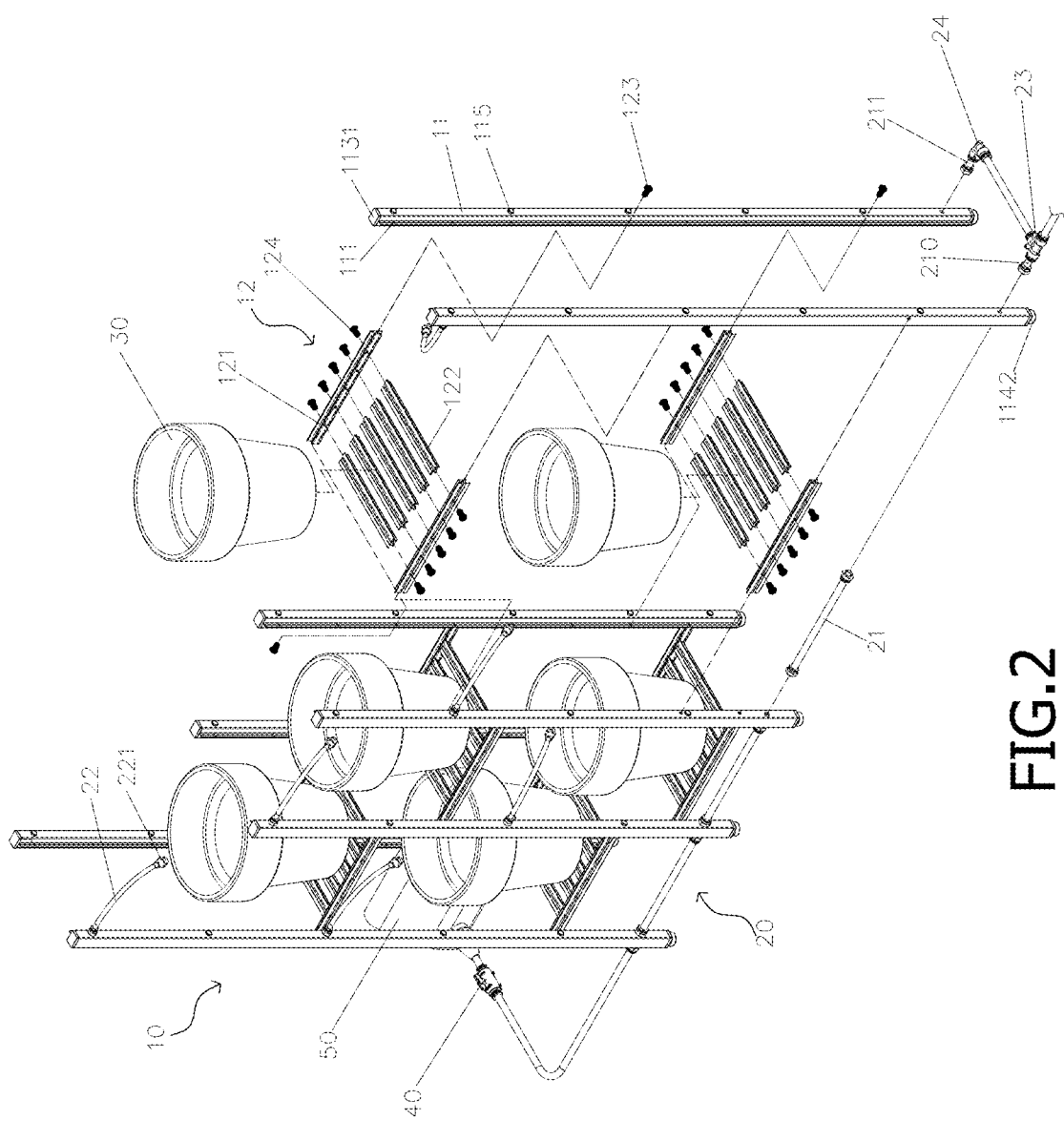
FIG. 2 shows an exploded three-dimensional view of part of the flowerpot stand and part of the waterway device, according to the present invention.
Figure 3:
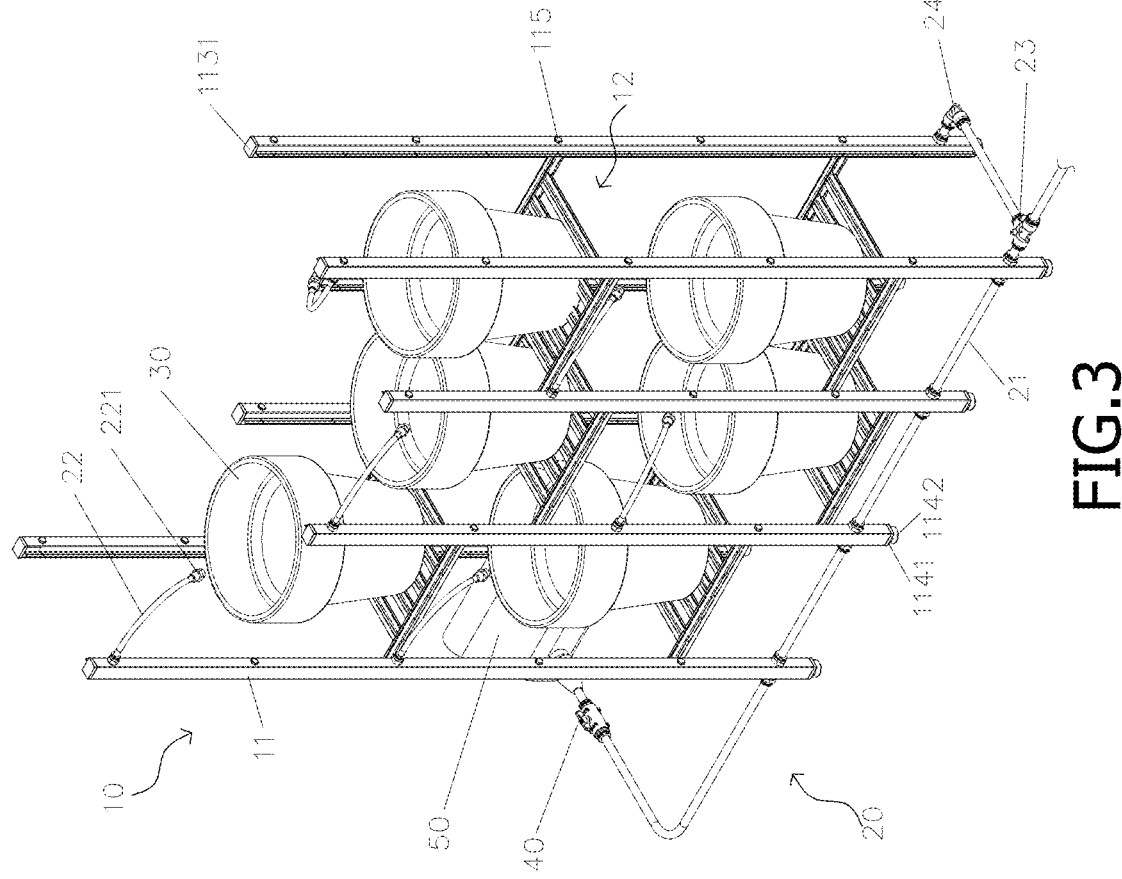
FIG. 3 shows a three-dimensional view of the assembly of the present invention.
Figure 4:
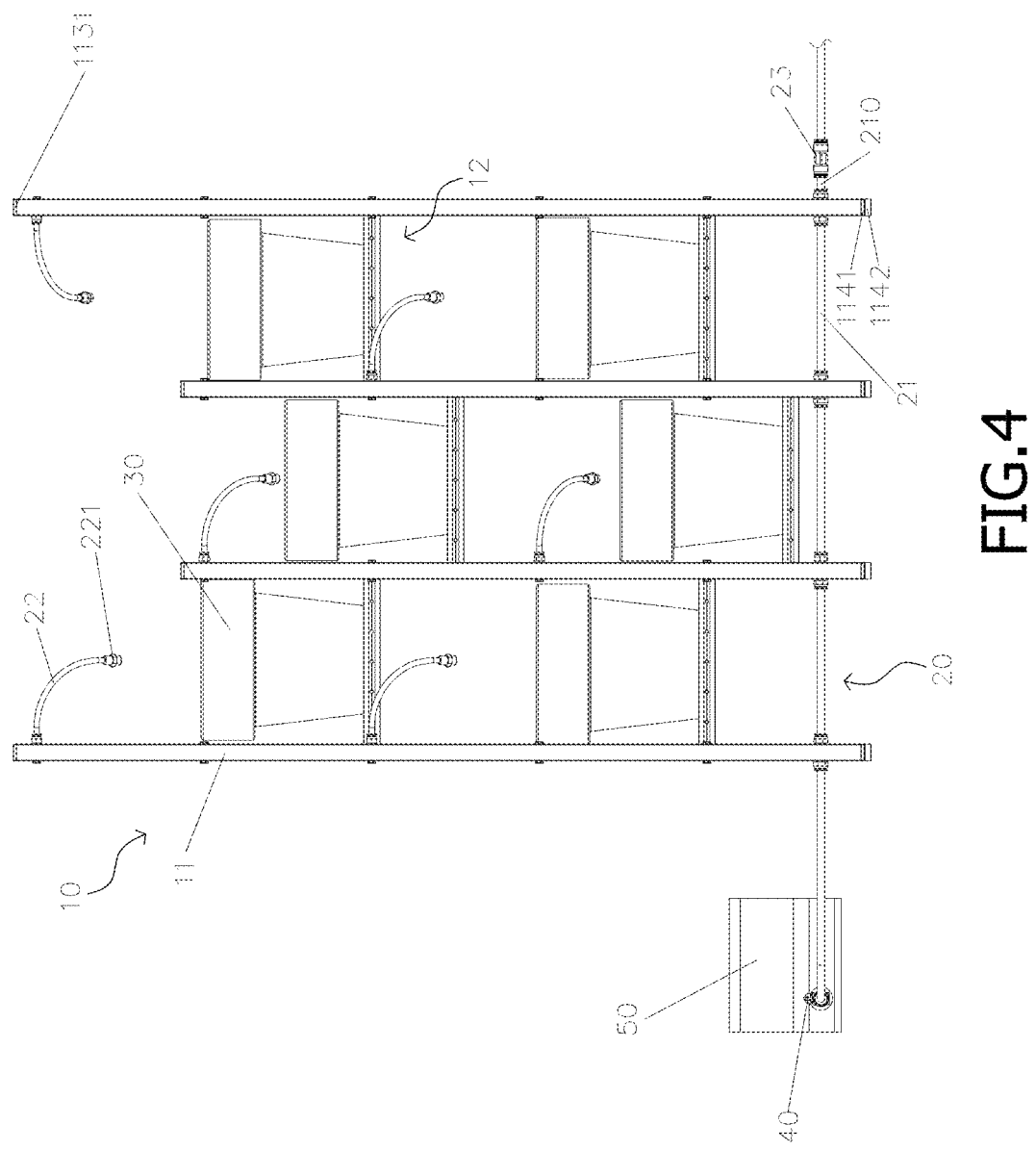
FIG. 4 shows a front planar view of the present invention.

As shown in FIGS. 1 to 3, the lower through-hole 1120 below the pole 11 in the front row at the outermost side can be connected to a hollow nut 11211, a seal ring 11221 and a short lower water hose 210. The short lower water hose 210 is then connected to a T-joint 23, and a vertical joint 231 (as shown in FIG. 1) of the T-joint 23 can be connected again to a lower water hose 21. The lower water hose 21 is connected to a bent joint 24, a short lower water hose 211, a hollow nut 11212, and a seal ring 11222. The lower water hose 21 is then connected into the lower through-hole 1120 at the bottom of the pole 11 in the rear row, allowing the water source to be connected to the poles 11 in the rear row through the poles 11 in the front row. The poles 11 in the rear row can be also connected to the upper water hoses 22, and the water source can be poured into the flowerpots 30 from the nozzles 221. Or, another joint 232 (as shown in FIG. 1) of the T-joint 23 in the same direction is not sealed, but a lower water hose 21 is connected to another set of flowerpot stand 10, allowing the waterway to be extended to another set of flowerpot stand 10. On the other hand, if the waterway is not extended to another set of flowerpot stand 10, another joint 232 of the T-joint 23 in same direction can be sealed as well.

The present invention is provided with following advantages that:

1. The poles 11 of flowerpot stand 10 are a support structure and also a waterway.
2. The entire appearance is beautify and elegant, neat and uniform without the irregular waterway. Although the lower water hose 21 at the bottom is exposed outward, it is at the most bottom as invisible without affecting the appearance. Therefore, there is no need to set up the piping that are exposed explicitly, and the water source can flow through the needed poles 11 completely.
3. Each lower water hose 21 is fixed reliably by each hollow nut 11210 (11211, 11212), and each upper water hose 22 is fixed reliably by the hollow nut 1121. Therefore, each lower water hose 21 and each upper water hose 22 will not be loosening, even when the consumer moves the flowerpot stand 10 by oneself, which improves the shortcomings in the conventional flowerpot stand that the waterway should be tightened additionally otherwise the waterway can be loosening easily, and the appearance is not beautiful.
4. The pole 11 is extended with the assembly board 111, and the pole 11 and the assembly board 111 are made of an aluminum alloy. All the bearing elements 12 are set up by the assembly boards 111, which are solid and reliable. In addition, the pole 11 does not need to be drilled with holes additionally to set up the bearing element 12, which improves the shortcomings in the conventional flowerpot stand that the pole needs to be drilled with the holes additionally to set up the bearing element, water can leak from the holes of the pole, and the poles cannot be used as the waterway all the time.
5. In addition to that the poles 11 in the front row are provided with a waterway to flow through, the poles 11 in the rear row can be also provided with a waterway to flow through.
6. A waterway of one set of flowerpot stand 10 can flow to another set of flowerpot stand 10, or the flowerpot stand 10 that is set up extendedly can be also extended with a waterway for flow. The consumer can extend and set up the flowerpot stand 10 and extend the waterway by oneself according to the need and environment, and the assembly is easy and convenient.

7. The cost can be saved. The water flows through the poles 11, without a need for extra piping and strip ties, which saves the cost.
8. The flow control valve 40 and the time switch 50 of the waterway device 20 are optional. When the flow control valve 40 is assembled, the outlet flow can be controlled; whereas, when the time switch 50 is assembled, the water source can be turned on or off at regular time. Therefore, when the consumer leaves the house for several days, he or she can plan time and flow rate in advance, allowing the bonsai to keep moisturized without being blighted and faded.
9. There are the poles 11 which are connected to the lower water hoses 21 but not connected to the upper water hoses 22. These poles 11 can be used to store, discharge or drain water.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A waterway structure for a flowerpot stand, comprising plural poles, each of which is a hollow vertical rod, with a space being disposed between two poles to form a front row of poles opposite to a rear row of poles to be arranged into at least two rows;

plural bearing elements, each of which is disposed between two neighboring poles for placing a flowerpot, wherein, an exterior side of each pole is provided with an assembly board, the assembly board of a front row pole is opposite to the assembly board of a rear row pole, each pole is provided with plural through-holes and a lower through-hole located at the bottom end of each pole, the bearing element is constituted by two horizontal rods and plural longitudinal rods, the horizontal rods are perpendicular to the longitudinal rods, the horizontal rods are disposed between two neighboring poles in the front row as well as between the two neighboring poles in the rear row, and the longitudinal rods are distributed between the two horizontal rods; and a waterway device, which is constituted by plural lower water hoses and plural upper water hoses, wherein the lower water hoses are assembled to the lower through-holes located at the bottom ends of the poles in the front row, the lower water hoses are connected between the bottom ends of adjacent poles, one of the through-holes located above the lower through-hole of each pole is connected to a corresponding upper water hose, a tail end of the upper water hose is a nozzle, the nozzle is disposed above the flowerpot, the water source enters into the connected pole through the lower water hose and flows to the upper water hose, thereby spraying into the flowerpot through the nozzle.

2. The waterway structure for a flowerpot stand, according to claim 1, wherein the assembly board of each pole is combined at the horizontal rods of the bearing element by transfixing with plural studs.

3. The waterway structure for a flowerpot stand, according to claim 1, wherein the horizontal rods of the bearing element are combined at the longitudinal rods by transfixing with plural studs.

4. The waterway structure for a flowerpot stand, according to claim 1, wherein the lower water hose enters into the lower through-hole of each pole and is combined at an outer side of each pole by a hollow nut and a seal ring, and the lower through-hole of each pole is a threaded hole.

5. The waterway structure for a flowerpot stand, according to claim 1, wherein the upper water hose enters into the through-hole and is combined at the outer side of each pole by a hollow nut and a seal ring, and the through-hole is a threaded hole.

6. The waterway structure for a flowerpot stand, according to claim 1, wherein the through-hole that is not connected to the upper water hose or the lower through-hole located at the bottom end of each pole that is not connected to the lower water hose is blocked by a solid nut.

7. The waterway structure for a flowerpot stand, according to claim 1, wherein a top end of the pole is provided with a top opening, and the top opening is blocked by a top plug.

8. The waterway structure for a flowerpot stand, according to claim 1, wherein the bottom end of the pole is provided with a bottom opening, the bottom opening is blocked by a bottom plug, and a bottom surface of the bottom plug is combined with a foot pad.

9. The waterway structure for a flowerpot stand, according to claim 1, wherein the lower through-hole located at the bottom end of one pole of the poles in the front row is connected to a hollow nut, a seal ring and a short lower water hose which is then connected to a T-joint; a vertical joint of the T-joint is connected again to a lower water hose, the lower water hose is connected to a bent joint, a short lower water hose, a hollow nut, and a seal ring; the lower water hose is then connected into the lower through-hole located at the bottom end of one pole of the poles in the rear row, and another joint of the T-joint in the same direction is sealed or is connected again to a lower water hose.

10. The waterway structure for a flowerpot stand, according to claim 1, wherein the lower water hose at the most front end of the waterway device is assembled with a flow control valve and a time switch, the flow control valve and the time switch are connected to a water source, and through the time switch and the flow control valve, the water source is fed and connected into each lower water hose at regular time and quantity.

\* \* \* \* \*